Feb. 1, 1927.
H. DOCK
ROTARY VALVE FOR INTERNAL COMBUSTION ENGINES
Filed Feb. 1, 1924    4 Sheets-Sheet 1
1,616,030
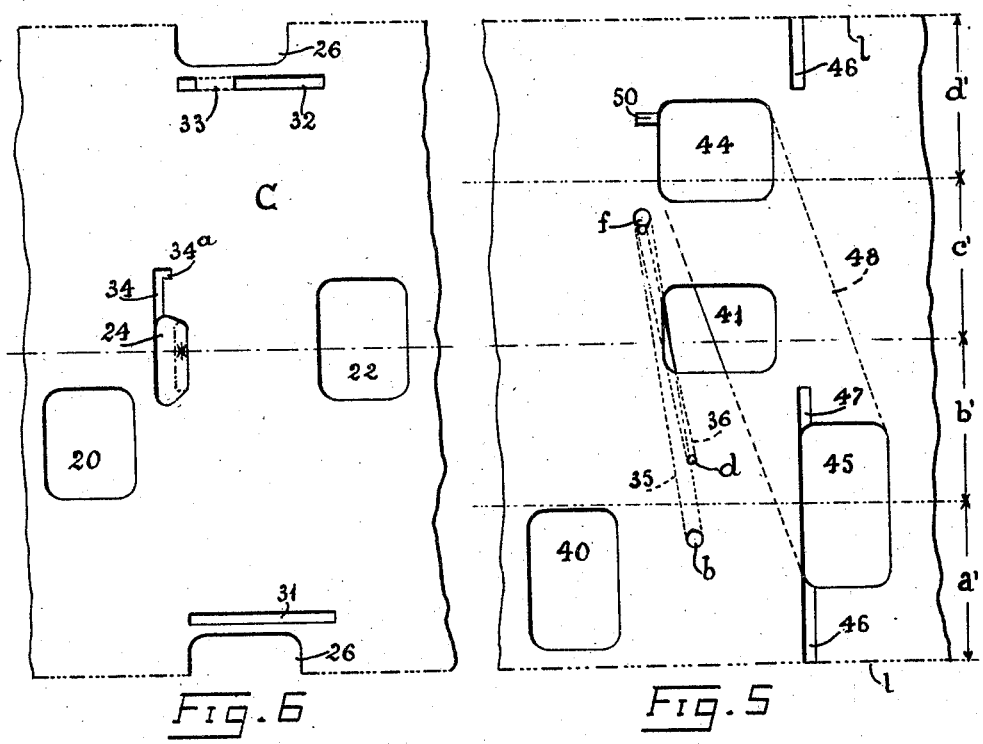
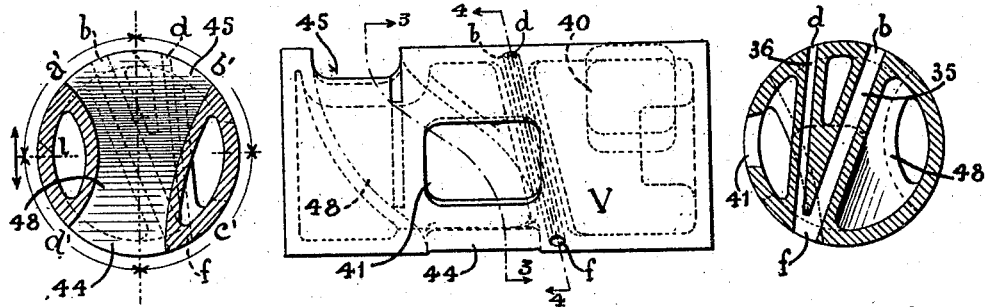
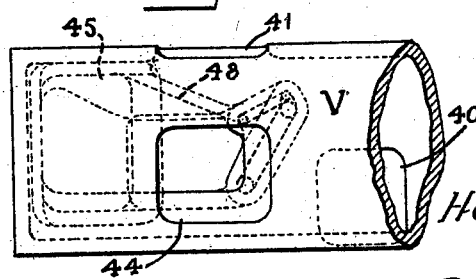
Inventor:
Herman Dock
By his Att'y

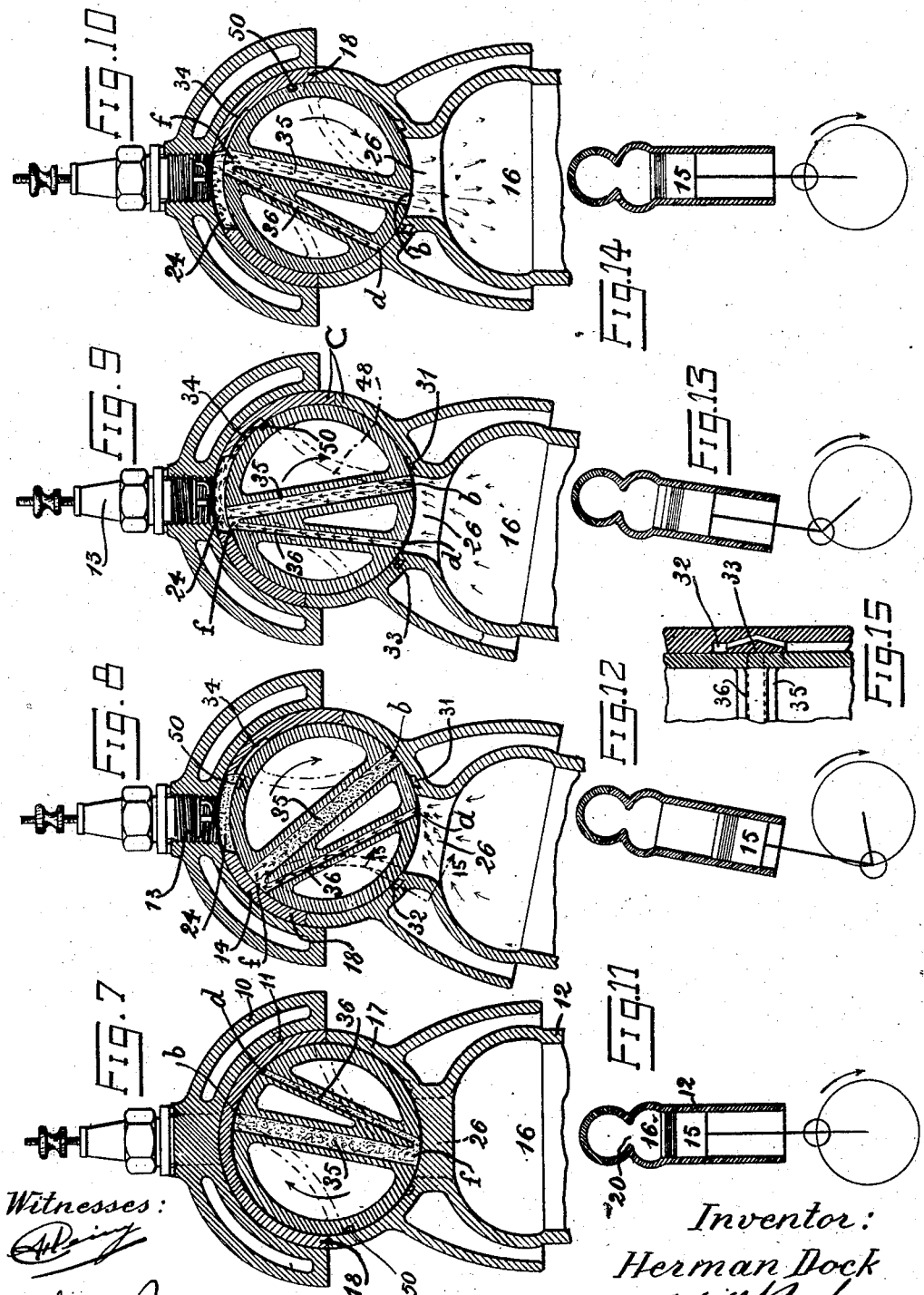

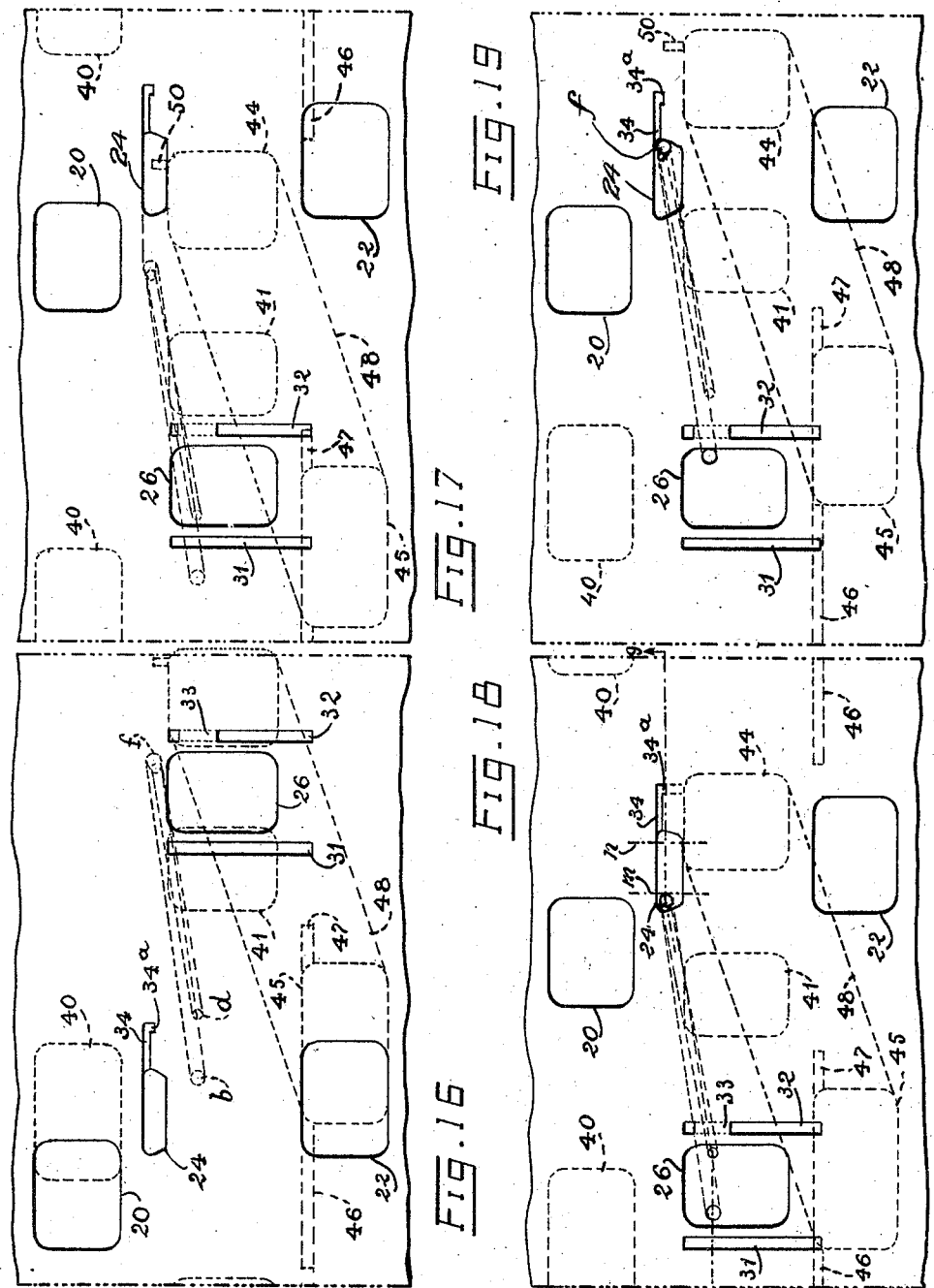

Feb. 1, 1927. 1,616,030
H. DOCK
ROTARY VALVE FOR INTERNAL COMBUSTION ENGINES
Filed Feb. 1, 1924 4 Sheets-Sheet 4
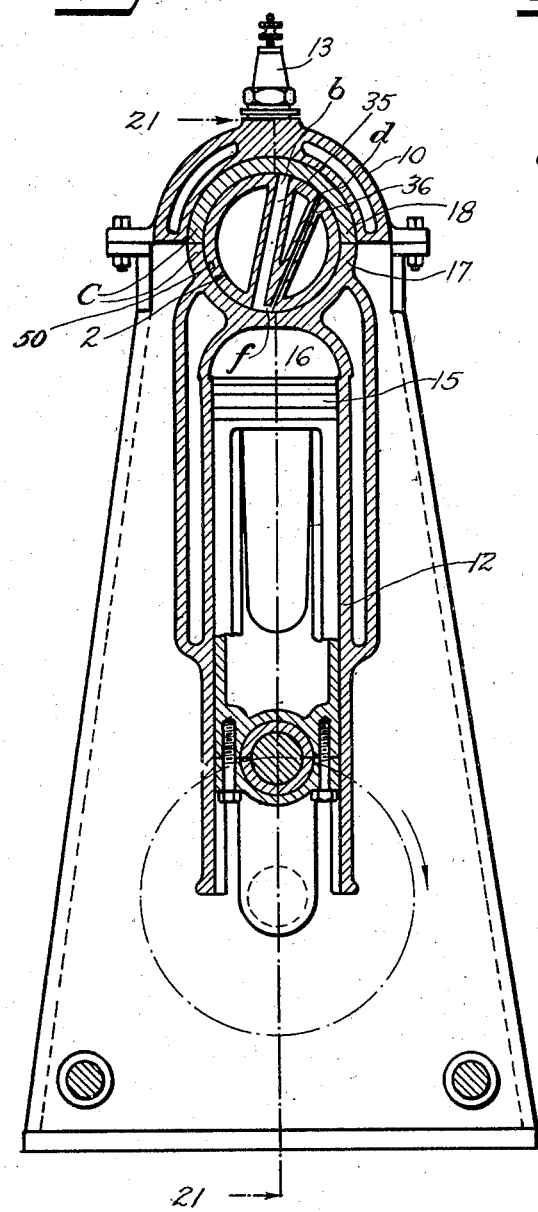
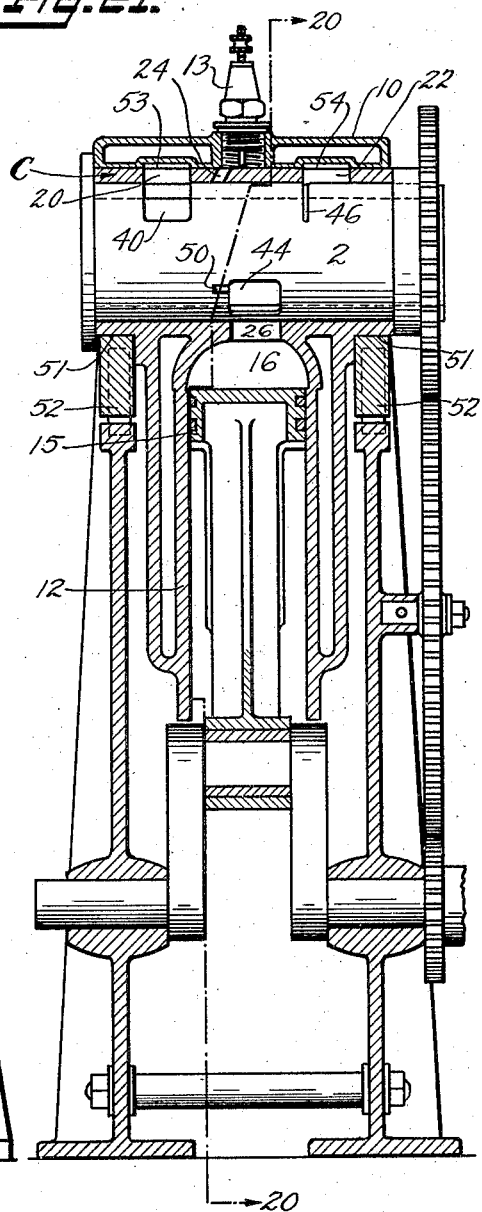
INVENTOR
*Herman Dock.*
BY
*Gustav Drews*
ATTORNEY Patented Feb. 1, 1927.

1,616,030

UNITED STATES PATENT OFFICE.

HERMAN DOCK, OF PLEASANTVILLE, NEW YORK.

ROTARY VALVE FOR INTERNAL-COMBUSTION ENGINES.

Application filed February 1, 1924. Serial No. 689,925.

This invention relates to internal combustion engines, such as disclosed in my pending application for patent, Serial No. 607,793, filed December 19, 1922; and more particularly to a valve mechanism therefor.

One object of this invention is to provide a rotary valve wherein the charge of fresh compressed explosive mixture is utilized to displace the residual or burned gases from the ignition chamber, and to provide a direct connection of such fresh mixture from the ignition chamber to the explosion chamber or cylinder.

Another object of the invention is to provide a rotary valve having an ignition passage extending through or across the valve which shall, at the moment of ignition, be charged with fresh fuel mixture, in contact with and around the means of ignition. Heretofore it has not been practical to operate engines of this class with a through firing or ignition passage, because the burned gases of the previous explosion are compressed by the following compression stroke in the ignition passage and around the means of ignition, thereby rendering the firing of the charge uncertain or impossible.

Other objects of the invention will appear as the description proceeds; and while herein details of the invention are described, the invention is not limited to these, since many and various changes may be made without departing from the scope of the invention as claimed.

In the accompanying drawings, showing one embodiment of my invention, Fig. 1 is a longitudinal side elevation of the valve.

Fig. 2 is a similar view, looking from the bottom of Fig. 1.

Fig. 3 is a sectional view on line 3—3 of Fig. 1.

Fig. 4 is a sectional view on line 4—4 of Fig. 1.

Fig. 5 is a plane of the valve, developed from line 1 of Fig. 3, and divided into corresponding quadrants $a'$, $b'$, $c'$ and $d'$.

Fig. 6 is a plane development of the inner surface of the valve casing.

Figs. 7, 8, 9 and 10, are sectional views illustrating successive positions of the valve from intake to firing.

Figs. 11, 12, 13 and 14 are sectional views illustrating the position of the piston relative to the position of the valve in Figs. 7, 8, 9 and 10, respectively.

Fig. 15 is a segmental sectional view on line 15—15 of Fig. 8.

Figs. 16, 17, 18 and 19 are plane developments of the valve with casing superposed, showing, in dotted lines, successive positions of the firing and scavenging passages illustrated in section in Figs. 7, 8, 9 and 10, respectively.

Fig. 20 is a section of the entire engine on the line 20—20 of Fig. 21.

Fig. 21 is a section on the line 21—21 of Fig. 20.

Referring to Figs. 7, 8, 9 and 10 of the drawings, the improved engine comprises a fixed valve head 10, having an inner semi-cylindrical bearing surface 51, and supported by the blocks 52, shown in Fig. 21, to form a cylindrical sleeve bearing. The head 10, as shown in Fig. 21, is also provided with a suitable fuel inlet 53, and a suitable exhaust 54. A spark plug 13 is mounted in an opening therefor in head 10. A cylinder 12, having a piston 15 therein, is provided with an explosion chamber 16 and an upper semi-sleeve 17. A semi-circular sleeve member 18 cooperates with sleeve 17 to form a cylindrical casing, generally denoted by C, and which, for the purposes of description of this invention, will hereafter be considered and referred to as a single member. The casing C is oscillatably mounted in the inner bearing surface of head 10, substantially as shown in Figs. 20 and 21.

The cylindrical casing C, shown developed in Fig. 6, is provided with an inlet port 20 near one end, and a little out of longitudinal alinement therewith, near the opposite end, with an exhaust port 22. Near port 20, and between ports 20 and 22, there is provided an opening 24, constituting an ignition chamber. On the opposite side of casing C from chamber 24, there is located the cylinder port 26, and on either side of port 26, on the inner surface of the casing, there is provided a longitudinal pressure relief channel or groove, 31 and 32, Figs. 6 and 9. The groove 32, near one end, passes under a bridge 33, Figs. 6 and 15, the purpose of which will be explained later herein. On the inner surface of casing C there is a groove or channel 34 extending circumferentially from chamber 24 and terminating in a short longitudinal portion $34^a$.

A cylindrical valve V is rotatably mounted, as shown in Figs. 20 and 21 in casing C, and has a diametrical firing passage 35, Fig. 4, longitudinally inclined as shown in Fig. 1, and a scavenging passage 36, Fig. 4, lying in the same transverse plane as passage 35 and converging therewith near the surface of valve V on one side, forming a common opening $f$. The divergent ends of passage 35 and 36 are indicated by $b$ and $d$, respectively.

Fig. 5 is a plane development of valve V, and besides passages 35 and 36, the said valve is provided with inlet ports 40 and 41 to the interior of the valve, and exhaust ports 44 and 45 of an exhaust passage 48 therethrough. On the outer surface of valve V there is provided a circumferential scavenging groove or channel 46 extending from the inner corner of port 45 about one-fourth of the distance around the valve. From the opposite inner corner of port 45 another channel or groove 47 extends only a short distance, as shown in Fig. 5, in the direction opposite to groove 46. On the outer surface of valve V there is a small channel 50 extending longitudinally from one side of exhaust port 44, and arranged to communicate with channel $34^a$ once during each revolution of valve V.

Figs. 7, 11, 16, 20 and 21, show the position of piston 15, valve V and casing C at the beginning of intake. At this time, as shown in Fig. 21, the inlet port 40 of the valve V, the inlet port 20 of the casing C, and the fuel inlet 53 of the head 10, and the inlet port 41 and cylinder port 26, respectively, are in communication. Also, as shown in Fig. 7, the passages 35 and 36 are full of burned or residual gases, and are entirely enclosed by casing C.

In Figs. 8, 12 and 17, the piston 15 has been drawn downwardly completing its intake stroke and has moved upwardly on its compression stroke. The ratio of crank shaft to valve rotation is two to one. At the position of piston in Fig. 12, the valve V has advanced to the position shown in Fig. 8. During this advance, opening $d$ of passage 36 has passed over channel 31 which communicates with exhaust port 45, and at such time as passage 35 and channel 31 register, the pressure from expanded gases in passages 35 and 36 is relieved, and the gases partially exhausted. And, as shown in Fig. 8, before opening $f$ reaches chamber 24, opening $d$ of passage 36 communicates with cylinder port 26 during the compression stroke of piston 15, and fresh fuel is forced into passage 36 and then into passage 35 through opening $f$, compressing the burned gases toward the opening $b$ of passage 35.

In Figs. 9, 13 and 18, the piston 15 has continued its compression stroke while valve V has advanced to the position shown in Fig. 9. However, before valve V reaches this position, and before opening $f$ reaches chamber 24 the opening $b$ of passage 35 communicates with channel 31. At this time, as opening $d$ of passage 36 is still in communication with port 26, passages 35 and 36 are cleared of burned gases and filled with fresh compressed fuel. When the valve V reaches the position shown in Fig. 9, communication is established between cylinder 12 and chamber 24 through both passages 35 and 36, and from chamber 24 to exhaust through channels 34, $34^a$ and 50. At this point compression is greatest and the chamber 24 is cleared of residual gases and filled with fresh fuel.

As piston 15 continues its upward stroke and valve V advances, opening $d$ of passage 36 passes over the bridge 33 in the channel 32 (Figs. 18 and 19); the bridge preventing loss of compression should firing not yet have taken place, or loss of power in case firing should occur at the time passage 36 is over channel 32. The range of variability of firing period is indicated by the dotted lines $m$ and $n$, Fig. 18.

In Figs. 10, 14 and 19 the piston is in firing position, while the valve is shown in extreme retarded firing position. With the exception of passage 35 from the ignition chamber 24 to cylinder 12, all passages are closed.

The foregoing description of operation covers a half revolution of the valve V, the other half revolution being the downward power stroke of piston 15, during which time all passages between valve V and casing C are closed.

At the same time, however, see Fig. 19, as the valve V, the openings of which are shown in dotted line position, continues towards the right, as there shown, the first communication to be established between the openings in the valve V and the openings in casing C will occur, when the groove 47 in communication with the exhaust port 45 of the valve V registers with the exhaust port 22 of the casing C. At this time, the exhaust port 44 of the valve V, however, will still be closed and remain closed until it registers with the cylinder port 26, whereupon the exhaust operation will take place, with the upward movement of the piston 15. Such exhaust action will continue until the inlet 40 of the valve V begins to register with the inlet 20 of the casing C, at which time the cylinder port 26 will still remain shut off from communication with the inlet port 41 of the valve V, and such exhaust will still continue until the exhaust port 44 passes beyond the cylinder port 26. By this time, the piston 15 will have reached the position indicated in Figs. 11, 20 and 21, ready for the intake action above explained.

Having thus described my invention, I claim:

1. In an internal combustion engine having an ignition chamber, a gas intake, an exhaust port, means for successively establishing at one time communication between said ignition chamber and said intake chamber to receive fresh fuel and thereupon establishing communication between said ignition chamber and said exhaust port to permit said fresh fuel to drive the burned gases in said ignition chamber before it out through said exhaust port.

2. In an internal combustion engine having an ignition chamber; a gas intake, an exhaust port, means for first establishing communication between said ignition chamber and said gas intake and thereupon establishing communication between said ignition chamber and said exhaust port, a rotary valve first adapted to direct fresh compressed fuel into said ignition chamber from said gas intake when communication is established with said gas intake, and thereupon, when communication is established with said exhaust port, driving the burned gases in said ignition chamber before it out through said exhaust port.

3. In an internal combustion engine having an ignition chamber; a gas intake, an exhaust port, fuel control mechanism comprising a casing and a valve rotatable therein for first establishing communication between said ignition chamber and said gas intake and thereupon establishing communication between said ignition chamber and said exhaust port, said valve and casing cooperating first to direct fresh fuel into said chamber after each explosion from said gas intake when communication is established with said gas intake, and thereupon, when communication is established with said exhaust port, driving the burned gases in said ignition chamber out before it through said exhaust port.

4. In an internal combustion engine having an ignition chamber; a gas intake, an exhaust port, fuel control mechanism comprising a casing and valve; said valve mounted within said casing and cooperating therewith for first establishing communication between said ignition chamber and said gas intake; to direct, after each explosion, fresh compressed fuel into said chamber and thereupon establishing communication between said ignition chamber and said exhaust port to force the burned gases out before it to exhaust.

5. In an internal combustion engine having an ignition and an explosion chamber; fuel control mechanism between said chambers adapted to direct fresh compressed fuel into said ignition chamber after each explosion and to force the burned gases therein to exhaust, and to provide a direct connection of fresh fuel between said chambers.

6. In an internal combustion engine, a casing having an explosion chamber and an ignition chamber, fuel controlling mechanism between said chambers comprising a rotatable valve member having a used fuel exhaust passage, a scavenging passage, and a firing passage, and there being a channel in said casing coacting with said scavenging passage, firing passage, ignition chamber, explosion chamber, and used fuel exhaust passage to clear burned gases from said ignition chamber.

7. In an internal combustion engine, a casing having an explosion chamber and an ignition chamber, fuel controlling mechanism between said chambers comprising a rotatable valve member having a used fuel exhaust passage, a scavenging passage, and a firing passage, and there being a relief channel in said casing coacting with said firing passage, scavenging passage, used fuel exhaust passage, and explosion chamber to clear said scavenging passage and firing passage of burned gases.

8. In an internal combustion engine, a casing having an explosion chamber and an ignition chamber, fuel controlling mechanism between said chambers comprising a rotatable valve member having a used fuel exhaust passage, a scavenging passage, and a firing passage, there being a channel in said casing coacting with said scavenging passage, firing passage, ignition chamber, explosion chamber, and used fuel exhaust passage to clear burned gases from said ignition chamber, and there being a relief channel in said casing coacting with said firing passage, scavenging passage, used fuel exhaust passage, and explosion chamber to clear said scavenging passage and firing passage of burned gases.

9. In an internal combustion engine, a casing having an explosion chamber and an ignition chamber, fuel control mechanism between said chambers comprising a rotatable valve member having a fuel supply passage, a scavenging passage and a firing passage, the scavenging passage and firing passage forming communications between said ignition chamber and explosion chamber to permit supplying said ignition chamber with fuel.

10. In an internal combustion engine, a casing having an explosion chamber and an ignition chamber, fuel control mechanism between said chambers comprising a rotatable valve member having a fuel supply passage, a scavenging passage and a firing passage, the firing passage affording communication between said ignition chamber and explosion chamber during ignition.

11. In an internal combustion engine, a casing having an explosion chamber and an ignition chamber, fuel control mechanism between said chambers comprising a rotatable valve member having a fuel supply passage, a scavenging passage and a firing passage, the scavenging passage and firing passage forming communications between said ignition chamber and explosion chamber to permit supplying said ignition chamber with fuel, and the firing passage alone affording communication between said ignition chamber and explosion chamber during ignition.

12. A tubular rotary valve member having a firing passage and a scavenging passage therethrough spaced apart at one side and communicating with one another at the opposite side.

13. An internal combustion engine, comprising a head having an inner semi-cylindrical surface; a semi-cylindrical casing received in said inner head surface and having an ignition opening; a cylinder having an upwardly extending semi-cylindrical casing with a cylinder port thereto, and mounted to cooperate with said casing in said head to provide an oscillatory valve sleeve; a cylindrical valve rotatably received in said sleeve having passages therethrough arranged to direct fresh compressed fuel from said cylinder to said ignition chamber during compression.

14. In an internal combustion engine having a head and cylinder; a rotary valve fuel control mechanism between said head and cylinder, comprising a casing connected to said cylinder and having an opening thereto, an exhaust port, and an ignition opening having an inner surface channel extending circumferentially therefrom; a valve rotatably mounted in said casing having a firing passage therethrough, and an exhaust passage provided at one end with an outer surface longitudinal groove therefrom; said valve and casing cooperating at one time during rotation of said valve within the casing to afford a passage from said cylinder through said ignition chamber to exhaust to remove the burned gases from said chamber.

15. In combination with an internal combustion engine having a cylinder; a fuel control mechanism cooperating with said cylinder, comprising a casing having an opening to said cylinder, and on the inner surface thereof adjacent to, on either side of said opening, a longitudinal relief channel; an exhaust port, and an ignition opening having on the inner surface of said casing a channel extending circumferentially therefrom; a valve rotatably mounted in said casing having a scavenging and a firing passage therethrough spaced apart on one side of said casing and converging near the opposite side thereof, and an exhaust passage through said valve provided at one end with an outer surface longitudinal groove therefrom; said valve and casing cooperating at one position of said valve relative to said casing to afford a passage from said cylinder through said scavenging passage, firing passage, and relief channel to exhaust for clearing said scavenging and firing passages of burned gases; and at another position to afford a passage from said cylinder to exhaust through said firing passage, ignition opening, ignition opening groove, and exhaust groove, to clear burned gases from said ignition opening and to provide a direct connection of fresh fuel from said ignition opening to said cylinder.

16. A tubular rotary valve member having a firing passage and a scavenging passage therethrough spaced apart at one side and converging near the opposite side.

17. A tubular rotary valve member having a diagonal exhaust conduit, offset intake openings, and a firing passage therethrough.

18. A tubular rotary valve member having an exhaust conduit, intake openings, and a firing passage therethrough out of communication with the interior of said valve.

19. A rotary valve member having diagonal conduit walls forming an exhaust conduit passing diagonally through the valve cylinder out of communication with the interior thereof and having its discharge end outside of the mid-zone of the member and its receiving end wider than the discharge end and positioned in said mid-zone; and a firing passage therethrough out of communication with the interior of said valve.

20. A tubular rotary valve member having an exhaust conduit; intake openings; and a firing passage and a scavenging passage therethrough out of communication with the interior of said valve.

21. A tubular rotary valve member having a diagonal exhaust conduit; offset intake openings; and inclined firing and scavenging passages therethrough out of communication with the interior of said valve; said passages being spaced apart on one side of said valve and converging near the opposite side thereof.

HERMAN DOCK.